US009295955B2

(12) United States Patent
Ni et al.

(10) Patent No.: US 9,295,955 B2
(45) Date of Patent: Mar. 29, 2016

(54) MIXING APPARATUS AND PROCESS

(71) Applicant: NITECH SOLUTIONS LIMITED, Glasgow (GB)

(72) Inventors: Xiongwei Ni, Edinburgh (GB); Andrew Fitch, Lanarkshire (GB); Ian Laird, Glasgow (GB)

(73) Assignee: NITECH SOLUTIONS LIMITED, Glasgow (GB)

( * ) Notice: Subject to any disclaimer, the term of this patent is extended or adjusted under 35 U.S.C. 154(b) by 183 days.

(21) Appl. No.: 14/265,492

(22) Filed: Apr. 30, 2014

(65) Prior Publication Data

US 2014/0233349 A1    Aug. 21, 2014

Related U.S. Application Data

(62) Division of application No. 12/373,831, filed as application No. PCT/GB2007/002808 on Jul. 24, 2007, now Pat. No. 8,746,963.

(30) Foreign Application Priority Data

Jul. 25, 2006    (GB) .................................. 0614810.0

(51) Int. Cl.
*B01F 5/06* (2006.01)
*B01F 17/56* (2006.01)
*B01J 19/00* (2006.01)
*B01J 19/24* (2006.01)

(52) U.S. Cl.
CPC ............... *B01F 5/0688* (2013.01); *B01F 5/061* (2013.01); *B01F 5/0682* (2013.01); *B01J 19/006* (2013.01); *B01J 19/2435* (2013.01)

(58) Field of Classification Search
CPC ............................ B01J 19/006; B01J 19/2435
USPC ................................................ 366/336, 153.3
See application file for complete search history.

(56) References Cited

U.S. PATENT DOCUMENTS 2,667,407 A    1/1954  Fenske
3,674,740 A    7/1972  Vernaleken et al.
3,701,793 A    10/1972 Schmidt et al.
(Continued)

FOREIGN PATENT DOCUMENTS

DE    20 19 333    11/1971
EP    0 366 469    5/1990
(Continued)

OTHER PUBLICATIONS

International Search Report Issued in PCT/GB2007/002808 on Nov. 23, 2007.
(Continued)

*Primary Examiner* — Tony G Soohoo
(74) *Attorney, Agent, or Firm* — Nixon & Vanderhye, P.C.

(57) ABSTRACT

A continuous, semi-continuous or fed-batch mixing apparatus and process for producing and maintaining a consistently mixed substance uses a tubular vessel equipped with a plurality of annular baffles configured to initiate and maintain uniform mixing and efficient dispersion of the substance in the tubular vessel, with a pump to impart unidirectional linear and non-oscillatory motion to the substance in the tubular vessel thereby promoting and maintaining uniform mixing and efficient dispersion of the substance.

6 Claims, 1 Drawing Sheet

(56) References Cited

U.S. PATENT DOCUMENTS

| | | |
|---|---|---|
| 4,000,086 A | 12/1976 | Stoev et al. |
| 4,832,500 A | 5/1989 | Brunold et al. |
| 5,749,653 A | 5/1998 | Kurtz |
| 6,319,996 B1 | 11/2001 | Burke et al. |
| 6,429,268 B1 | 8/2002 | Xiongwei |
| 7,235,175 B2 | 6/2007 | Brisset |
| 2010/0216631 A1 | 8/2010 | Ni et al. |
| 2011/0014487 A1 | 1/2011 | Gann et al. |
| 2011/0288060 A1 | 11/2011 | Ruecroft et al. |
| 2013/0123427 A1 | 5/2013 | Luettgen |

FOREIGN PATENT DOCUMENTS

| | | |
|---|---|---|
| GB | 2276559 | 10/1994 |
| GB | 2427372 | 12/2006 |
| WO | 96/31442 | 10/1996 |
| WO | 2007/05661 | 5/2007 |
| WO | 2008/012520 | 1/2008 |

OTHER PUBLICATIONS

International Preliminary Report on Patentability Issued in PCT/GB2007/002808 on Nov. 3, 2008.

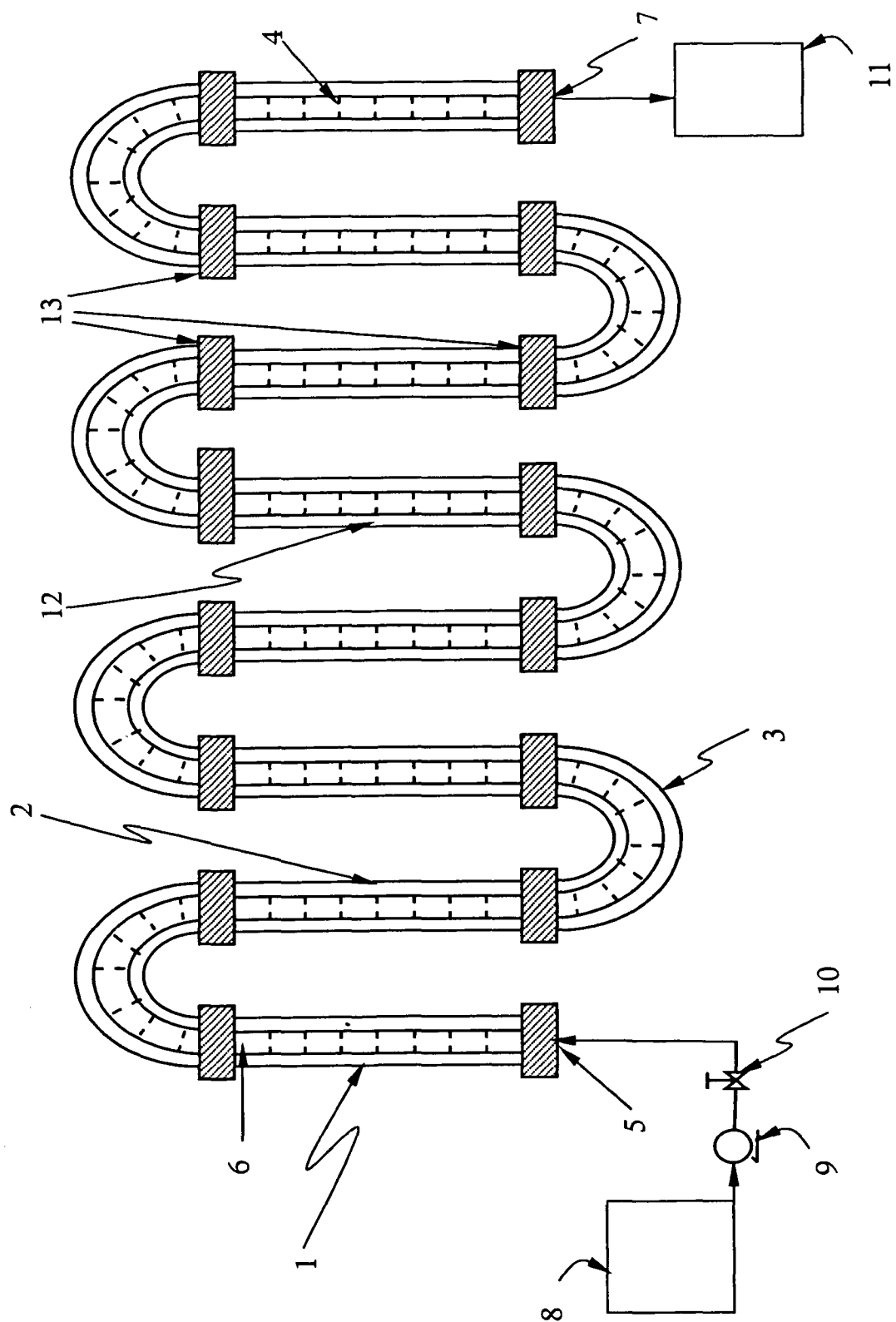

MIXING APPARATUS AND PROCESS

This application is a Divisional of U.S. patent application Ser. No. 12/373,831, which was accorded a filing date of Nov. 25, 2009, and which is a U.S. National Phase of International Application No. PCT/GB2007/002808, filed Jul. 24, 2007, which designated the U.S. and claims priority to Great Britain Application No. 0614810.0, filed 25 Jul. 2006, the entire contents of each of which are hereby incorporated by reference.

TECHNICAL FIELD

The present invention relates to an improved mixing apparatus and process for maintaining consistently mixed materials. In particular, the present invention relates to an improved apparatus and method for the transportation of suspensions and dispersions incorporating solids, liquids and/or gases with consistent mixing.

BACKGROUND ART

Existing technologies for transporting and mixing materials include tubular, loop or pipe reactors (such as the BHR Group Limited Flex-Reactor). However, the use of such reactors in the transportation of consistently mixed materials has several limitations and drawbacks. In particular, some form of disruption to the flow is often used to ensure that effective mixing is maintained. Disrupting the flow introduces an extra element of complexity, and impedes the progress of the transportation of the mixture.

It is known to use oscillatory baffled apparatus to carry out reactions, whilst simultaneously transporting the reaction mixture. For example, European Patent EP 1 076 597 discloses the use of an apparatus and method for phase separated synthesis in which aqueous media is continuously fed through a reactor vessel, reacting with an organic liquid phase to provide for the phase separated synthesis of particulates in a continuous manner, at ambient pressure and elevated temperatures. Oscillatory baffled reactors such as this have already been shown to be very effective in mixing.

However, the use of oscillatory baffled reactors by necessity requires the introduction of a means for producing oscillations. This often complicates the design of the equipment, and in turn the design of any plant in which the equipment is to be used. In particular, there are many technical challenges that must be addressed around the oscillation and sealing arrangement.

Therefore, it is an object of the present invention to obviate or mitigate at least some of the drawbacks associated with the prior art.

Further aims and objects of the invention will become apparent from reading the following description.

DISCLOSURE OF THE INVENTION

According to a first aspect of the present invention, there is provided a continuous, semi-continuous or fed-batch mixing apparatus for producing and maintaining a consistently mixed substance, the substance comprising at least a first phase and a second phase, the apparatus comprising:
  a tubular vessel;
  at least one supply means operatively connected to the tubular vessel to supply at least one of the first and second phases;
  a plurality of annular baffles configured to initiate and maintain uniform mixing and efficient dispersion of the substance in the tubular vessel, the annular baffles being spaced apart in a substantially equidistant manner, and arranged substantially in parallel, such that they extend radially inwards from the side of the tubular vessel; and
  flow control means configured to impart unidirectional linear motion to the substance in the tubular vessel;
wherein the flow control means is configured to sustain a flow of the substance at a sufficient flow rate such that uniform mixing and efficient dispersion of the first and second phases is produced and maintained.

The substance can be a mixture of miscible or immiscible fluids; a reaction mixture of a chemical reaction; a dispersion, suspension, emulsion or micro-emulsion; or any other suitable material with at least some fluid properties.

The phases may be fluids (i.e., liquids or gases) or may be solids in a fluid form, e.g. particulates such as monomer beads, prills, granules, crystals, powders etc.

The spacing of the baffles and the control of the flow rate is effective in producing and maintaining uniform mixing and efficient dispersion of a substance flowing in the vessel. As this mixing is achieved without oscillation, much of the complexity involved in the design of the apparatus and associated plant is removed. In particular, the apparatus of the present invention requires fewer parts than oscillatory apparatus and obviates the considerable technical challenges associated with imparting oscillation to a sealed system. The baffles also aid the formation of turbulent flow at flow rates lower than those necessary when using traditional loop or pipe reactors.

The plurality of annular baffles are joined together by rails in a substantially equidistant manner, and arranged substantially in parallel, such that they extend radially inwards from the side of the vessel.

Optionally the apparatus further comprises a second supply means to supply at least one of the first and second phases to the tubular vessel.

Preferably the distance between the annular baffles is between 1d and 2d, where d is the diameter of the tubular vessel.

The annular baffles may be substantially flat plates comprising an aperture located approximately centrally in said plate.

The aperture is adapted to impart a substantial amount of unsteadiness in flow on the substance.

Optionally the tubular vessel further comprises pressure alteration means for changing the pressure in the tubular vessel.

The pressure alteration means may alter the pressure between vacuum and 300 bar.

Optionally at least one access port is provided for the introduction of other phases or species into the tubular vessel.

Preferably the flow control means comprises a pump configured to impart unidirectional linear motion to the substance in the tubular vessel.

The unidirectional linear motion is substantially non-oscillatory.

Preferably the flow control means is configured to impart a flow rate which gives a Reynolds number greater than 500 to the substance in the tubular vessel.

The flow of the substance in the tubular vessel is laminar flow.

According to a second aspect of the present invention there is provided a continuous, semi-continuous or fed-batch mixing process for producing and maintaining a consistently mixed substance, the substance comprising at least a first phase and a second phase, the process comprising the steps of:

providing a supply of at least one of the first and second phases to a tubular vessel;

initiating and maintaining uniform mixing and efficient dispersion of the substance in the tubular vessel, using a plurality of annular baffles, the annular baffles being spaced apart in a substantially equidistant manner, and arranged substantially in parallel, such that they extend radially inwards from the side of the tubular vessel; and imparting unidirectional linear motion to the substance in the tubular vessel using flow control means;

wherein the unidirectional linear motion is imparted using the flow control means to sustain a flow of the substance at a sufficient flow rate such that uniform mixing and efficient dispersion of the first and second phases is produced and maintained.

Optionally the process further comprises the provision of a second supply means to supply at least one of the first and second phases to the tubular vessel.

Optionally the process further comprises the alteration of pressure in the tubular vessel.

Optionally the process further comprises the alteration of pressure between vacuum and 300 bar.

Optionally the process further comprises the provision of further phases or species into the tubular vessel through at least one access port.

Preferably the unidirectional linear motion is a non-oscillatory motion.

Preferably a flow rate which gives a Reynolds number greater than 500 to the substance in the tubular vessel is imparted by the flow control means.

Preferably the flow of the substance in the tubular vessel is laminar flow.

According to a third aspect of the present invention there is provided a continuous, semi-continuous or fed-batch mixing process for producing and maintaining a consistently mixed polysaccharide mixture, the process comprising the steps of:

providing a supply of a solvent and a supply of polysaccharide to a tubular vessel;

initiating and maintaining uniform mixing and efficient dispersion of the polysaccharide and solvent in the tubular vessel, using a plurality of annular baffles, the annular baffles being spaced apart in a substantially equidistant manner, and arranged substantially in parallel, such that they extend radially inwards from the side of the tubular vessel; and imparting unidirectional linear motion to the polysaccharide and solvent in the tubular vessel using flow control means;

wherein the unidirectional linear motion is imparted using the flow control means to sustain a flow of the polysaccharide and solvent at a sufficient flow rate to produce and maintain a uniformly mixed and efficiently dispersed polysaccharide mixture.

BRIEF DESCRIPTION OF DRAWINGS

The present invention will now be described by way of illustrative example only, with reference to the accompanying drawing in which the single FIGURE shows a schematic sectional view of a tubular vessel in accordance with the present invention.

MODES FOR CARRYING OUT THE INVENTION

Referring to FIG. 1, a tubular baffled vessel is generally depicted at 1 and comprises tubular members 2 connected by U bends 3. This forms a continuous flow system for fluid media. Extending radially inwards from the side of the vessel there are a number of annular baffles 4. The baffles are a type of orificed plate. The annular baffles 4 are joined together by rails (not shown in FIG. 1) in a substantially equidistant manner, and are arranged substantially in parallel. The annular baffles 4 are provided within the flow path formed by the tubular members 2.

To impart motion to the contents of the vessel 1, the vessel can receive and discharge fluids, and has inlets 5 and 6 and an outlet 7. The apparatus 1 also comprises a feed tank 8 fluidly connected to the vessel 1 via input 5. Located between the feed tank 8 and the input 5 there is a feed pump 9 and a control valve 10 for controlling the input of fluids to the vessel 1. Located at a distance end of the vessel there is a product tank 11, fluidly connected to the vessel 1 by the output 7.

The apparatus 1 also contains a sheath 12 for controlling and maintaining a consistent temperature or a consistent gradient of temperature profile in the vessel 1 using a chiller/heater (not shown in FIG. 1). The connecting blocks 13 along the tubular vessel 1 can be used for addition, product removal, bleeding, sampling, monitoring, probing and any other process control.

The tubular vessel can be pressurised using (for example) nitrogen, and the pressure can vary from vacuum to 300 bar.

PROCESS EXAMPLE 1

Use of the system of FIG. 1 will now be described with reference to the transportation of a starch suspension with consistent mixing.

The feed tank 8 is charged with a starch suspension. The feed tank is then agitated using a set of moving baffles (not shown in FIG. 1) for a certain amount of time and the valve 10 is opened to allow the feed to be added to the tubular vessel 1 to a predetermined level.

Thereafter, motion is imparted on the contents of the tubular vessel using the pump 9. The pump imparts motion on the constituents in a non-oscillatory fashion. Also, in this example, the pump is adapted to impart a flow rate which gives a Reynolds number greater than 500 to the contents of the tubular vessel, and the flow of the contents or substance in the tubular vessel is laminar flow. The contents are then transported, with the maintenance of consistent mixing, along the length of the tubular vessel. The mixture can be drawn off at a suitable outlet port.

The tubular members 2 may be a single straight tube configuration; and may be alternatively positioned and assembled using C-connectors to provide a substantially S-shaped configuration wherein the tubular members are more compactly assembled, alternately diverging and converging rather than lying in parallel.

The process of the present invention will now be further illustrated in connection with biodiesel production. The by-product glycerol, together with base catalyst and unused excess methanol, is separated from the main product, biodiesel, in the production. In order to purify glycerol for high value markets, the catalyst firstly has to be removed, and the excess methanol be distilled. The tubular baffled reactor 1 is used to remove the catalyst from the glycerol. The "waste" stream containing glycerol, base catalyst and the excess methanol is stored in the feed tank 8, and then pumped into the tubular baffled reactor 1 at the input 5 at a given flow rate that ensures the net flow Reynolds number is greater than 500. While the tubular baffled reactor is heated up to a reaction temperature, the waste stream is re-circulated within the vessel 1. Once the reaction temperature has been reached, $CO_2$ gas is introduced into the vessel 1 at the input 6, and the reaction of 2NaOH (Liquid)+$CO_2$ (Gas)=$Na_2CO_3$ (Solid)+$H_2O$ is then taken place along the tubular baffled reactor 1. After a full residence time of a few minutes, the product and water are directed to the product tank 11, where the $Na_2CO_3$ solids are filtered out. In this process, the adequate flow rate together with the presence of the baffle plates ensures small and uniform bubble sizes, excellent dispersion of $CO_2$ gas into the glycerol mixture, and full reaction.

PROCESS EXAMPLE 2

While the above Example 1 involves a liquid-gas mixture, the tubular baffled vessel 1 is also useful for nitration of toluene, which is a liquid-liquid type reaction. In this operation, the mix of acids (mainly nitric acid and sulphuric acid) is premixed in the feed tank 8 and pumped into the tubular baffled vessel 1 via the metering pump 9 and control valve 10 at a flow rate such that the net flow Reynolds number exceeds 500. The mixed acids are re-circulated while the tubular baffled vessel 1 is heated up to the reaction temperature of 130° C. Once the temperature has been reached, toluene at a given temperature (either at room temperature or pre-heated) is introduced into the vessel 1 at the input point 6. The sufficient flow rate together with the presence of baffle plates ensures most effective dispersion of toluene enabling small and uniform toluene droplets to be formed in the mixed acid stream along the vessel 1. The nitration reaction takes place, and the product of nitrotoluene is continuously generated and re-directed into the product tank 11.

PROCESS EXAMPLE 3

Use of the tubular baffled vessel suitable for solid-liquid processes will now be described with reference to a starch modification process. A slurry of starch-water is pumped into the vessel 1 continuously via the metering pump 9 and the control valve 10 at a given rate so that the net flow Reynolds number is greater than 500. At the same time, the vessel 1 is heated up to a given reaction temperature using the jacket facility 12. When the reaction temperature has been reached, acetic anhydride is added at the input point 6, and the acetylation reaction takes place along the vessel. By controlling the pH along the tubular baffled vessel 1 by addition of base at 13, the product of the modified starch is continuously collected at the product tank 11. In this process, the starch solid particles with solid concentrations up to 55% are uniformly suspended in the liquid phase due to the uniform mixing and near plug flow conditions achieved by combining the flow rate and the baffle plates, while in the absence of fluid oscillation unit.

Advantages

The present invention enables more efficient transport of mixed materials, avoiding the formation of precipitates and blockages, due to uniform mixing, efficient dispersion and enhanced mass transfer rates. The apparatus is suitable for transportation of mixtures of reactants and/or products, suspensions, emulsions and dispersions comprising solids, liquids and gases. In the present process, using a starch solution, a solid is suspended in a liquid phase. In addition, other embodiments of the present invention are envisaged where the use of improved mixing facilitates enhanced chemical reactions and the selective crystallisation of materials.

Variants in Use and Alternative Embodiments

The apparatus described can be used as a continuous, semi-continuous or fed-batch mixing apparatus for producing and maintaining a consistently mixed substance, the substance comprising at least a first phase and a second phase. The apparatus has a tubular vessel and at least one supply means operatively connected to the tubular vessel to supply at least one of the first and second phases. The operative connection can be a supply of gas, liquid or solid materials or a mixture thereof.

Attached to the inside of the tubular vessel there is a plurality of annular baffles configured to initiate and maintain uniform mixing and efficient dispersion of the substance in the tubular vessel. The annular baffles are spaced apart in a substantially equidistant manner, and arranged substantially in parallel, such that they extend radially inwards from the side of the tubular vessel.

The annular baffles can be substantially flat plates comprising an aperture located approximately centrally in said plate. The aperture may be adapted to impart a substantial amount of unsteadiness in flow on the substance in the tubular vessel.

The apparatus has a flow path through which the substance may flow. A flow control means, such as a pump that supplies a liquid, is configured or adjusted to impart unidirectional linear motion to the substance in the tubular vessel. The pump is configured to sustain a flow of the substance at a sufficient flow rate such that uniform mixing and efficient dispersion of the first and second phases is produced and maintained. The unidirectional linear motion imparted may be non-oscillatory motion.

The flow path may be formed by a single straight tube configuration; or in alternative embodiments, it may be formed at least in part by curved tubular components to accommodate a flow path in a compact volume. Thus, in one form, the flow path may comprise an assembly of baffled tubes using direction-changing connectors, e.g. U-connectors to accommodate a plurality of parallel juxtaposed tubes, or C-connectors to provide a substantially S-shaped configuration wherein the flow path is more compactly formed, such that the plurality of tubes form limbs configured in an alternately diverging V and converging A arrangement.

The process as described can be used as a continuous, semi-continuous or fed-batch mixing process for producing and maintaining a consistently mixed substance, the substance comprising at least a first phase and a second phase. The process involves providing a supply of at least one of the first and second phases to a tubular vessel and initiating and maintaining uniform mixing and efficient dispersion of the substance in the tubular vessel, using a plurality of annular baffles as described above.

The process also involves imparting unidirectional linear motion to the substance in the tubular vessel using flow control means such as a pump. The unidirectional linear motion is imparted using the pump to sustain a flow of the substance at a sufficient flow rate such that uniform mixing and efficient dispersion of the first and second phases is produced and maintained. The unidirectional linear motion is non-oscillatory motion.

The processes described involve applying a flow rate which gives a Reynolds number greater than 500 to the substance in the tubular vessel, and the flow of the substance in the tubular vessel is laminar flow.

The processes described herein can be used to produce a consistently mixed polysaccharide mixture in a continuous, semi-continuous or fed-batch manner. Such a process would involve providing a supply of solvent and a supply of polysaccharide to a tubular vessel, and initiating and maintaining uniform mixing and efficient dispersion of the polysaccharide and solvent in the tubular vessel, using a plurality of annular baffles.

The process would also involve imparting unidirectional linear motion to the polysaccharide and solvent in the tubular vessel using a pump, or other flow control means, to sustain a flow of the polysaccharide and solvent at a sufficient flow rate to produce and maintain a uniformly mixed and efficiently dispersed polysaccharide precipitates.

The apparatus and process of the present invention demonstrate many advantages over the prior art. For example, by achieving efficient mixing without using oscillation, the process is simplified and much of the complexity involved in the design of the apparatus and associated plant is removed. In particular, the apparatus of the present invention requires fewer parts than oscillatory apparatus and obviates the considerable technical challenges associated with imparting oscillation to a sealed system.

Other prior art devices include tubular, loop or pipe reactors incorporating static mixer inserts. However the baffles of the present invention aid the production of turbulent flow, and thus mixing, at a reduced flow rate compared to these prior art apparatus. Importantly, the tubular baffled system of the present invention is excellent with processes containing solids, in contrast to the prior art devices using static mixer inserts.

INDUSTRIAL APPLICABILITY

The apparatus and process of the present invention produces good solid suspension, consistent and effective dispersion of liquids within liquids, and the effective transport of a dispersed gas, including effective mass transfer. Good particle suspension is demonstrated by the consistent size distribution of particles that are measured at the end of a process, and consistent and effective dispersion of liquids in liquids is illustrated by the consistency of droplet size.

The transportation of species such as this has not previously been achieved without the use of oscillatory motion on the constituents.

Improvements and modifications may be incorporated herein without deviating from the scope of the invention as defined by the claims.

The invention claimed is:

1. A continuous, semi-continuous or fed-batch mixing apparatus for producing and maintaining a consistently mixed substance, the substance comprising at least a first phase and a second phase, the apparatus comprising:
   a tubular vessel having a flow path;
   at least one supply device operatively connected to the tubular vessel to supply at least one of the first and second phases;
   a plurality of annular baffles in the form of substantially flat plates comprising an aperture located approximately centrally in said plates and configured to produce local turbulent flow, the annular baffles being spaced apart in a substantially equidistant manner, and arranged substantially in parallel, such that they extend radially inwards from the side of the tubular vessel, the distance between the annular baffles being between 1d and 2d, where d is the diameter of the tubular vessel; and
   a flow control device configured to impart non-oscillatory, unidirectional linear motion to the substance in the tubular vessel;
   wherein the flow control device is configured to impart a flow rate which gives a net flow Reynolds number greater than 500 and laminar flow to the substance in the tubular vessel.

2. An apparatus as claimed in claim 1, wherein the apparatus further comprises a second supply device to supply at least one of the first and second phases to the tubular vessel.

3. An apparatus as claimed in claim 1, wherein the tubular vessel further comprises a pressure alteration device for changing the pressure in the tubular vessel.

4. An apparatus as claimed in claim 3, wherein the pressure alteration device may alter the pressure between vacuum and 300 bar.

5. An apparatus as claimed in claim 1, wherein at least one access port is provided for the introduction of other phases or species into the tubular vessel.

6. An apparatus as claimed in claim 1, wherein the flow control device comprises a pump configured to impart unidirectional linear motion to the substance in the tubular vessel.

* * * * *